US012143832B2

United States Patent
Hu et al.

(10) Patent No.: US 12,143,832 B2
(45) Date of Patent: Nov. 12, 2024

(54) NEURAL NETWORK CIRCUIT REMOTE ELECTRICAL TILT ANTENNA INFRASTRUCTURE MANAGEMENT BASED ON PROBABILITY OF ACTIONS

(71) Applicant: Telefonaktiebolaget LM Ericsson (publ), Stockholm (SE)

(72) Inventors: Wenfeng Hu, Täby (SE); Jaeseong Jeong, Solna (SE); Vladimir Verbulskii, Athlone (IE); Rodrigo Correia, Athlone (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 457 days.

(21) Appl. No.: 17/614,025

(22) PCT Filed: Jun. 3, 2019

(86) PCT No.: PCT/SE2019/050509
§ 371 (c)(1),
(2) Date: Nov. 24, 2021

(87) PCT Pub. No.: WO2020/246918
PCT Pub. Date: Dec. 10, 2020

(65) Prior Publication Data
US 2022/0248237 A1    Aug. 4, 2022

(51) Int. Cl.
*H04W 16/24*    (2009.01)
*G06N 3/08*    (2023.01)
(Continued)

(52) U.S. Cl.
CPC .............. *H04W 16/24* (2013.01); *G06N 3/08* (2013.01); *G06N 5/048* (2013.01); *H04W 24/08* (2013.01)

(58) Field of Classification Search
CPC ..... H04W 24/02; H04W 24/08; H04W 24/10; H04W 16/18; H04W 24/04; H04W 16/28;
(Continued)

(56) References Cited

U.S. PATENT DOCUMENTS 10,039,016 B1 *   7/2018 Larish .................. H04W 24/02
10,841,853 B1 * 11/2020 Yousefi'zadeh ..... H04B 17/318
(Continued)

FOREIGN PATENT DOCUMENTS

EP    3107152 A1    12/2016
EP    3109938 A1    12/2016
(Continued)

OTHER PUBLICATIONS

International Search Report and Written Opinion of the International Searching Authority for PCT International Application No. PCT/SE2019/050509 dated Apr. 9, 2020.
(Continued)

*Primary Examiner* — Olumide Ajibade Akonai
(74) *Attorney, Agent, or Firm* — Sage Patent Group

(57) ABSTRACT

A network metrics repository stores cell performance metrics and rule-based data measured during operation of a communication network. A policy neural network circuit has an input layer having input nodes, a sequence of hidden layers, and at least one output node. A processor trains the policy neural network circuit to approximate a baseline rule-based policy for controlling a tilt angle of a remote electrical tilt (RET) antenna based on the rule-based data. The processor provides a live cell performance metric to input nodes, adapts weights that are used by the input nodes responsive to output of the output node, and controls operation of the tilt angle of the RET antenna based on the output The output node provides the output responsive to processing a stream of cell performance metrics through the input
(Continued)

nodes. The processor controls operation of the RET antenna based on the output.

20 Claims, 10 Drawing Sheets

(51) Int. Cl.
*G06N 5/048* (2023.01)
*H04W 24/08* (2009.01)

(58) Field of Classification Search
CPC ....... H04W 16/24; H04W 8/22; H04W 84/18; H04W 16/22; H04W 88/08; H04W 28/08; H04W 28/0289; H04W 52/343; H04L 41/16; H04L 41/0894; H04L 25/0254; H04L 25/03165; H04L 41/147; G06N 20/00; G06N 3/02; G06N 3/045; G06N 3/08; G06N 3/044; G06N 5/01; G06N 7/01; G06N 3/042; G06N 3/0464; G06N 3/092; H04B 17/373; H01Q 1/246
See application file for complete search history.

(56) References Cited

U.S. PATENT DOCUMENTS

| | | | | |
|---|---|---|---|---|
| 2013/0028107 | A1* | 1/2013 | Ho | H04W 24/02 370/252 |
| 2013/0142183 | A1* | 6/2013 | Lee | H04L 5/0057 455/517 |
| 2019/0014488 | A1* | 1/2019 | Tan | G06N 3/044 |
| 2019/0149425 | A1 | 5/2019 | Larish et al. | |

FOREIGN PATENT DOCUMENTS

| | | | | |
|---|---|---|---|---|
| EP | 3316491 | A1 | 5/2018 | |
| GB | 2586868 | A * | 3/2021 | G06N 3/006 |
| WO | WO-2018077420 | A1 * | 5/2018 | G06T 17/05 |

OTHER PUBLICATIONS

Fan et al., "Self-optimization of coverage and capacity based on a fuzzy neural network with cooperative reinforcement learning," EURASIP Journal on Wireless Communications and Networking 2014, 2014 (57), 15 pages.

Pan et al., "Policy Gradients for Contextual Recommendations," WWW '19: The World Wide Web Conference, May 2019, pp. 1421-1431.

Achiam et al., "Constrained Policy Optimization," ICML'17: Proceedings of the 34th International Conference on Machine Learning—vol. 70, Aug. 2017, pp. 22-31.

Schulman et al., "Trust Region Policy Optimization," ICML'15: Proceedings of the 32nd International Conference on International Conference on Machine Learning—vol. 37, Jul. 2015, pp. 1889-1897.

Behzadian et al., "Feature Selection by Singular Value Decomposition for Reinforcement Learning," accepted at the FAIM workshop "Predicion and Generative Modeling in Reinforcement Learning," Stockholm Sweden, 2018, 6 pages.

Extended European Search Report mailed May 13, 2022 for European Patent Application No. 19932055.7, 11 pages.

Razavi, R. et al.; "Self-Optimization of Capacity and Coverage in LTE Networks Using a Fuzzy Reinforcement Learning Approach", 21st Annual IEEE International Symposium on Personal, Indoor and Mobile Radio Communications; Sep. 26, 2010; Piscataway, New Jersey; 6 pages.

Balevi, Eren et al.; "Online Antenna Tuning in Heterogeneous Cellular Networks with Deep Reinforcement Learning", Cornell University Library; Mar. 15, 2010; Ithaca, New York; 30 pages.

Pecka, Martin et al.; "Safe Exploration Techniques for Reinforcement Learning—An Overview", MESAS 2014; LNCS 8906; May 5, 2014; 19 pages.

Garcia, Javier et al.; "Safe Exploration of State and Action Spaces in Reinforcement Learning"; Journal of Artificial Intelligence Research, vol. 45; Jan. 1, 2012; 50 pages.

* cited by examiner

---
Algorithm 1 Policy optimization via safety exploration
---
1: Input: Baseline policy based on fuzzy-logic $\pi_0$, pre-trained policy network $\pi_\theta$, critic network $Q_\phi$, experience buffer $B$, hyper-parameters $M, \epsilon$
2: for episodes $k = 1,2,...,$ do
3:     Observe the state $s$ from environment
4:     if $\text{dist}(\pi_0(s), \pi_\theta(s)) < \epsilon$ then
5:         Sample action $\hat{a}$ from $\pi_\theta$ and execute it
6:         Observe reward $r_{\hat{a}}$
7:     else
8:         Sample action $\bar{a}$ and $\hat{a}$ from $\pi_0$ and $\pi_\theta$ respectively
9:         if $Q_\phi(s, \bar{a}) > 0$ or $Q_\phi(s, \hat{a}) < 0$ then
10:            Execute action $\bar{a}$ and observe reward $r_{\bar{a}}$
11:         else
12:            Execute action $\hat{a}$ and observe reward $r_{\hat{a}}$
13:         end if
14:     end if
15:     Save the $(s, \bar{a}, r_{\bar{a}})$ or $(s, \hat{a}, r_{\hat{a}})$ into experience buffer $B$
16:     if $\text{mod}(k, M)$ is 0 then
17:         Train $\pi_\theta$ and $Q_\phi$ using experiences in $B$ via actor-critic algorithms
18:         if Average $r_{\hat{a}} > 0$ then
19:            Increase the value of $\epsilon$
20:         else
21:            Decrease the value of $\epsilon$
22:         end if
23:         reset Average $r_{\hat{a}}$
24:     end if
25: end for
---

FIGURE 15

NEURAL NETWORK CIRCUIT REMOTE ELECTRICAL TILT ANTENNA INFRASTRUCTURE MANAGEMENT BASED ON PROBABILITY OF ACTIONS

BACKGROUND

The present disclosure relates to remote electrical tilt antenna infrastructure management.

Cell shaping is a very important area in radio network optimizations, be it manual tuning or a self-organizing network (SON) approach. It is preferable for the optimal size for each cell in the network to be found. The cell size should not cover too much or too little. It is preferable that the cell should be just the right size.

There are different ways to perform cell shaping. One approach is to change the electrical antenna tilt, which may be done remotely, using a Remote Electrical Tilt (RET) device, attached to or embedded into the antennas.

In one approach, a conventional antenna tilting algorithm strives to balance three policies: coverage, capacity and quality. Coverage policy may seek to provide strong enough signal to all users, including those at the cell edge. Capacity policy may seek to prevent congestion and try to balance the load between cells. Quality policy may seek to improve the signal quality by e.g., reducing the interference in cells.

In current RET control systems, problems may exist where policies are assigned manually, and the user needs to tune the policies using multiple settings. Additional problems may include that conventional solutions do not adapt well to scenarios (e.g., rural, urban, high mobility etc.). Yet, each of the scenarios might need to be treated differently.

SUMMARY

According to some embodiments of inventive concepts, a remote electrical tilt antenna management computer system is provided that includes a network metrics repository, a fuzzy logic circuit, a policy neural network circuit, and at least one processor. According to other embodiments of inventive concepts, a remote electrical tilt antenna management computer system is provided that includes a network metrics repository, a fuzzy logic circuit, a policy neural network circuit, a critic neural network circuit, and at least one processor. The policy neural network may decide a probability of actions for the tilt angle of a RET antenna (e.g., uptilt, downtilt, or no change in tilt angle). In some embodiments, optionally, the critic neural network may evaluate actions of the policy neural network, how the actions should be adjusted, and provides the adjustment(s) to the policy neural network. The network metrics repository stores live cell performance metrics and rule-based data including cell performance metrics that were measured during operation of a communication network. The rule-based data was generated by an expert and/or rule-based policy. The fuzzy logic circuit includes at least one fuzzy inference circuit. The policy neural network circuit includes an input layer having input nodes, a sequence of hidden layers each having a plurality of combining nodes, and an output layer having at least one output node. The at least one processor is configured to train the policy neural network circuit, when the policy neural network circuit is offline a communication network, to approximate a baseline rule-based policy for controlling a tilt angle of a remote electrical tilt antenna based on the rule-based data stored in the network metrics repository and fuzzy logic data generated by the fuzzy logic circuit applying fuzzy logic to the rule-based data to generate data sets. The fuzzy data sets include a correlated set of a cell performance metric, a tilt angle of a remote electrical tilt antenna, and a reward value to output a probability of actions for a cell under evaluation. The at least one processor is further configured to provide to the input nodes of the policy neural network circuit live data received from a live communication network. The live data includes a live cell performance metric for a cell under evaluation and/or a neighboring cell. The at least one processor is further configured to adapt the weights that are used by at least the input nodes of the policy neural network circuit responsive to a policy reward value of an output of the at least one output node of the policy neural network circuit when the policy neural network circuit is in communication with the live communication network. The at least one processor is further configured to control operation of the remote electrical tilt antenna based on output of the at least one output node of the policy neural network circuit. The at least one output node provides the output responsive to processing of at least one live cell performance metric through the input nodes of the policy neural network circuit.

Some other related embodiments are directed to a computer program product that includes a non-transitory computer readable storage medium having computer readable program code stored in the medium, and when executed by at least one processor of a remote electrical tilt antenna management computer system performs operations. The operations include training the policy neural network circuit, when the policy neural network circuit is offline a communication network, to approximate a baseline rule-based policy for controlling a tilt angle of a remote electrical tilt antenna based on the rule-based data stored in the network metrics repository and fuzzy logic data generated by the fuzzy logic circuit applying fuzzy logic to the rule-based data to generate data sets. The fuzzy data sets include a correlated set of a cell performance metric, a tilt angle of a remote electrical tilt antenna, and a reward value to output a probability of actions for a cell under evaluation. The operations further include providing to the input nodes of the policy neural network circuit live data received from a live communication network. The live data includes a live cell performance metric for a cell under evaluation and/or a neighboring cell. The operations further include adapting the weights that are used by at least the input nodes of the policy neural network circuit responsive to a policy reward value of an output of the at least one output node of the policy neural network circuit when the policy neural network circuit is in communication with the live communication network. The operations further include controlling operation of the remote electrical tilt antenna based on output of the at least one output node of the policy neural network circuit. The controlling operation of the remote electrical tilt antenna may lead to control of the tilt of the remote electrical tilt antenna (e.g., uptilt, downtilt, or no change in tilt angle). The at least one output node provides the output responsive to processing at least one live cell performance metric through the input nodes of the policy neural network circuit.

Some other related embodiments are directed to a correspondence method by a remote electrical tilt antenna management computer system.

Other systems, computer program products, and methods according to embodiments will be or become apparent to one with skill in the art upon review of the following drawings and detailed description. It is intended that all such additional systems, computer program products, and methods be included within this description and protected by the accompanying claims.

A potential advantage that may be achieved is an improved decision making and control infrastructure for controlling tilt angles of a RET antenna that initially learns from static rule-based data generated by rule-based decision making. During online learning and controlling, policy improvement may be bounded by the rule-based policy and by safety restraints for maintaining or improving network performance.

BRIEF DESCRIPTION OF THE DRAWINGS

Aspects of the present disclosure are illustrated by way of example and are not limited by the accompanying drawings. In the drawings:

FIG. 15 illustrates an algorithm for policy optimization via safety exploration, the operations of which are performed by a remote electrical tilt antenna management computer system in accordance with some embodiments.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout the detailed description.

Further problems that may exist with conventional solutions may include not using past experiences to improve algorithm performance, which may lead to sub-optimal decisions. Additional problems that may exist with conventional solutions may include that conventional safety exploration algorithms may focus on policy space, for example as described in Schulman, John, et al., "Trust Region Policy Optimization", lcml Vol. 37, 2015, or on constrained policy optimization, for example as described in Achiam, Joshua, et al., "Constrained policy optimization", Proceedings of the 34th International Conference on Machine Learning, Volume 70, JMLR Org., 2017.

Fuzzy logic may be used to evaluate the need of an uptilt or a downtilt for the cell antenna. Fuzzy logic converts input values into fuzzy data sets. For example, key performance indicators (KPIs) may be input into a fuzzy logic circuit and fuzzified to convert each value into a range of values mapped to a characteristic of the KPI. A fuzzy inference engine may use rules to generate an output action (e.g., if interference is high, downtilt the antenna). The output action may be defuzzified to assign numeric values to the result (e.g., how much to uptilt/downtilt in degrees). An algorithm in such an approach works in an iterative manner. A preferable electrical antenna tilt may be achieved in small steps over a longer period of time.

In another approach, reinforcement learning may be considered. Reinforcement learning (RL) may be based on a Markov Decision Process (MDP) where an Agent may learn how to act optimally given the system state information and a reward function. This may enable development of self-learning systems that do not or seldom require human intervention or any hand-engineered, threshold-based policies.

Figure 13:
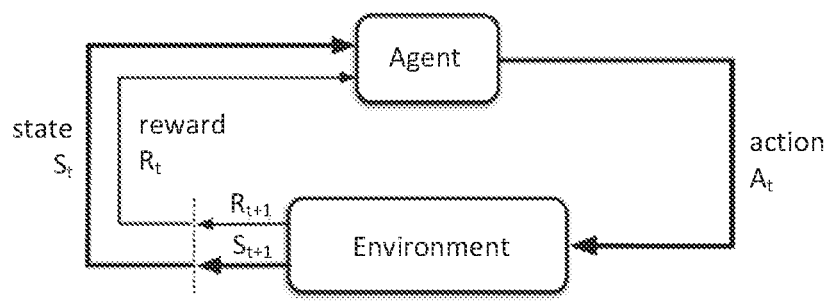
FIG. 13 illustrates a reinforcement learning approach.

In RL, an agent may perform actions on an environment and may observe possible state changes in the environment. The agent may receive a reward signal and attempt to find an optimal policy to maximize the total, discounted (i.e, the sum of all rewards discounted by a factor to account for the value of a present reward in view of prior rewards), future reward. FIG. 13 illustrates a RL approach.

Formalized, the Markov Decision Process is characterised by a tuple (S, A, p, r), where S denotes the state space of the environment, A denotes the action space, which is a set of all the possible actions $\alpha$ an agent can perform. Each action step can trigger a reward r, which measures how desirable certain actions may be.

New states may be drawn as $s_{t+1} \sim p(s_t, \alpha_t)$, where $p(s_t, \alpha_t)$ is a transition probability distribution of possible next states given current state and action. For each state, a value function $v(s_t)$ can be derived to estimate the value of being in that state as well a so-called quality function $Q(s_t, \alpha_t)$, after selecting a certain action.

The behaviour of an agent is called the policy and is denoted as $\pi: S \rightarrow A$. The goal of the agent is to try to find the optimal $\pi$ that maximizes the expected total future reward: $E[R_t = \Sigma_{k=t}^{DG} \gamma^{t-k} r_k]$ where $\gamma$ is a discount factor that controls how much the agent should focus on more immediate rewards versus long term rewards.

RL algorithms can be categorized as three families, value function based, policy gradient based and actor-critic based.

A function approximator can be used to approximate the value/quality function or the policy when the state-action space is large. One example of a function approximator is a Neural Network (NN). In cases where a NN is deep, with many hidden layers, an approach may be termed Deep Reinforcement Learning. Deep reinforcement learning has been used in current RL success stories.

Figure 14:
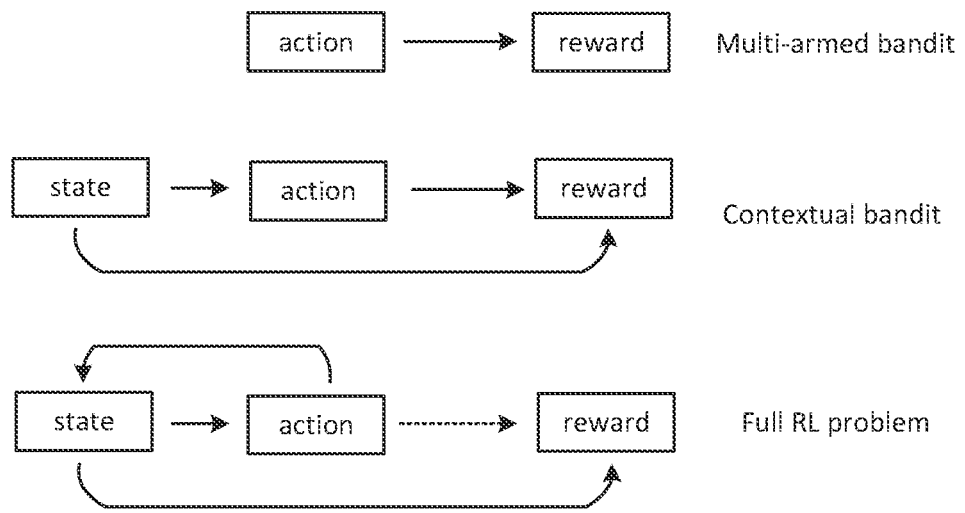
FIG. 14 illustrates a contextual bandit, Multi-armed bandit and a full reinforcement learning setup.

Contextual bandit is a problem which there are states, but they are not determined by previous states or actions. Thus, it is a special case of a full reinforcement learning problem where discount factor $\gamma=0$. Contextual bandit may also be referred to as a 1 step MDP problem. A simpler problem format may be referred to as Multi-armed bandit. In Multi-armed bandit, there is no state and only action would impact the reward feedback. FIG. 14 illustrates differences between contextual bandit, Multi-armed bandit and a full RL problem.

A RL agent may need to balance exploitation with exploration. Exploitation may be a strategy to select an action based on previously learned policy. Exploration may be a strategy to search for better policies using actions outside the current, learned, policy. Exploration may create opportunities, but also may induce risk that actions selected during this phase will not generate increased reward. In real-time service-critical systems with highly fluctuating state, exploration can have a detrimental impact on service quality. Safety exploration may be an important aspect of a production level RL system.

Certain aspects of the present disclosure and their embodiments may provide solutions to these and/or other challenges. Some embodiments of the present disclosure are directed to a remote electrical tilt antenna management computer system that may pre-train a neural network circuit with a rule-based policy, using a static dataset including operation logs and KPIs collected by operators, into a parameterized neural network circuit via supervised learning in the pre-training phase; and in an online learning phase, policy improvement is bounded by the rule-based policy and action-value function to control operations of a tilt angle of a RET antenna and achieve safety exploration in a live communication network while maintaining or improving network performance.

Certain embodiments may provide one or more of the following technical advantages. Some embodiments may provide for improved decision making operations by learning from the static rule-based data generated by conventional decision making operations. Some embodiments may further provide for policy improvement by safety exploration on the action space (i.e., on the tilt angles).

In various embodiments of inventive concepts, a policy neural network circuit may be trained with an existing rule-based policy (parameterized by the policy neural network circuit) as a supervised learning problem with training samples generated by expert and/or rule-based policy. The pre-trained policy may be deployed into a real world scenario, and the pre-trained policy may continue to improve its performance by back propagating policy gradients in a contextual bandit setup with safety exploration.

In various embodiments of inventive concepts, the following operations may be performed:
1. Training data collection and preprocessing. Training data may be collected from one or more mobile live networks. The training data may have been generated by experts and/or rule-based policy. The physical and traffic conditions of a targeting cell and its neighbor cells are contextual information (state), the probability to tilt antenna angle on target cell is action, and the KPI difference before and after tilting is the numerical reward.
2. A policy neural network circuit may be trained to approximate the rule-based policy (actor) with (state, action) data samples collected above as a supervised learning problem.
3. Another critic neural network circuit may approximate action-value function (critic) with (state, action, reward) data samples collected above as a supervised learning problem.
4. The policy neural network circuit and the critic neural network circuit may be deployed into a live network as a self-learning contextual bandit agent. The policy and critic neural network circuits each may make safety action exploration and observe a reward feedback. The policy neural network circuit may use the reward feedback to adjust the weights of policy and critic neural network circuits to continue to improve the expected reward. An exemplary algorithm pseudocode that may be used in connection with performing operations implementing inventive concepts is shown in FIG. 14 as described further below.
5. The learned policy neural network circuit may be deployed to other live networks.

Some embodiments of the present disclosure are directed to a RET antenna management computer system that trains a policy neural network circuit when the policy neural network circuit is offline a communication network. The policy neural network circuit may be trained to approximate a baseline rule-based policy for controlling a tilt angle of a RET antenna based on generating and using fuzzy logic data generated by a fuzzy logic circuit applying fuzzy logic to rule-based data from a communications network. The policy neural network circuit may then be deployed into a live communications network. Live data received from a live communication network may be provided to input nodes of the policy neural network circuit. Weights used by the input nodes may be adapted responsive to a policy reward value of an output of at least one output node of the policy neural network. The RET antenna management computer system may control the tilt of the RET antenna based on output of the at least one output node of the policy neural network circuit. The output is responsive to processing of at least one live cell performance metric through input nodes of the policy neural network circuit.

Rule-based policy distillation will now be discussed. In some embodiments of inventive solutions, two neural network circuits may be trained via supervised learning using experiences generated by rule-based or human experts' policy. A policy (actor) neural network circuit, ag, may be trained by (s, a) pairs. The goal of the actor is to approximate the rule based or expert policy. The available rule-based data may have fuzzy logic applied to the rule-based data to generate fuzzy logic data sets. The fuzzy logic data sets may be used to train a stochastic policy neural network circuit. Output of the policy neural network circuit may be a probability of actions. The actions include tilt increase, tilt decrease, or no change in tilt angle (e.g., there may be three possible actions (+1 for tilt up 1 degree, 0 for no change, and −1 for tilt down 1 degree). A stream of fuzzy logic data sets may be transferred into probability of actions. Soft labels providing a probability distribution of actions for the stream may be provided (e.g., rather than a specific value).

If the available data is expert generated, a deterministic policy neural network circuit may be trained where output may be hard labels.

Figure 1:
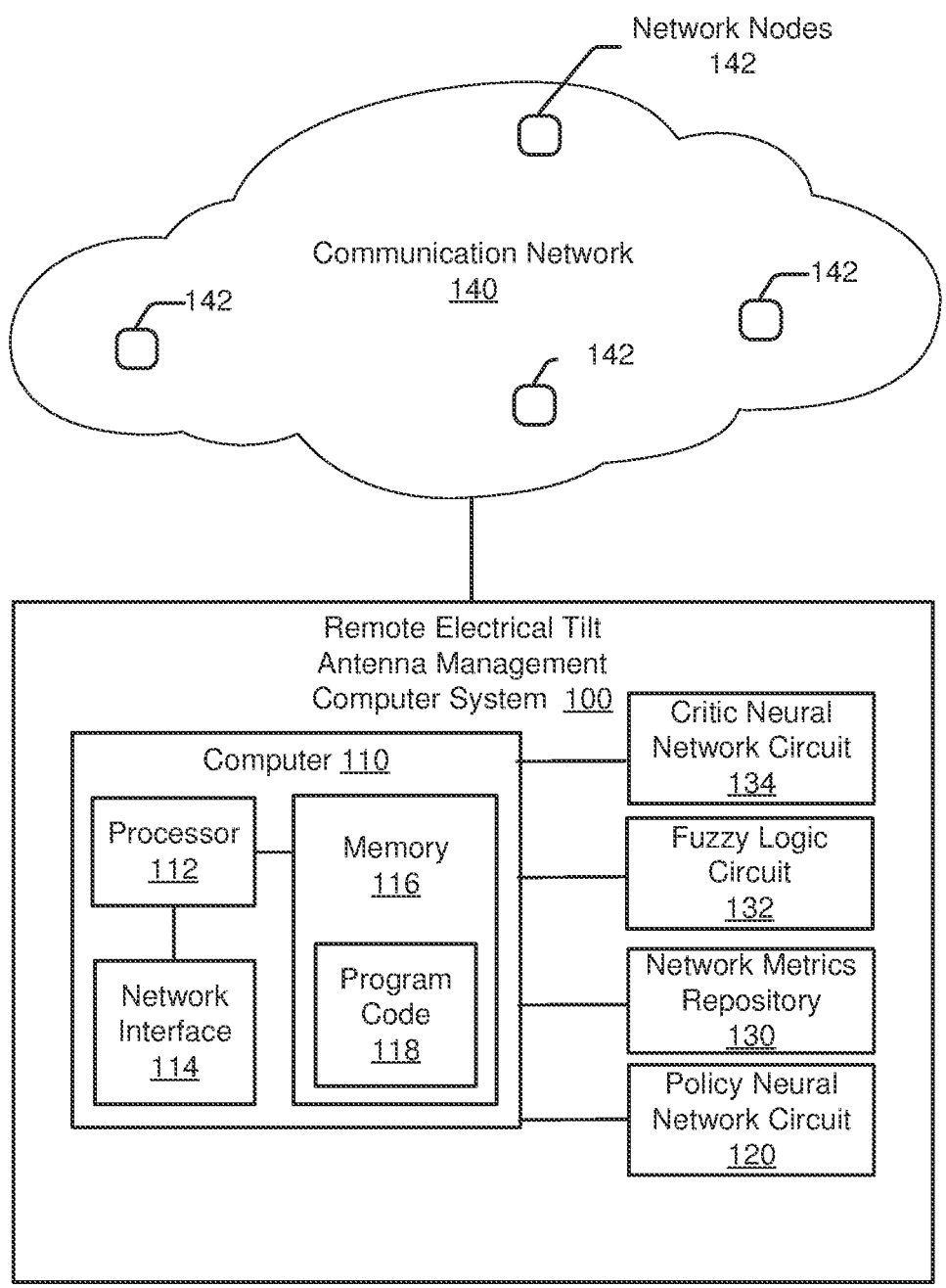
FIG. 1 illustrates a remote electrical tilt antenna management computer system that monitors operation of a tilt angle of a remote electrical tilt antenna for at least one cell in a communication network in accordance with some embodiments.

FIG. 1 illustrates a remote electrical tilt antenna management computer system 100 that monitors operation of a cell under evaluation (also referred to herein as a target cell) and its neighboring cells served by network node 142 in communication network 140. The remote electrical tilt antenna management computer system 100 includes a policy neural network circuit 120, a network metrics repository 130, a fuzzy logic circuit 132, a critic neural network circuit 134, and a computer 110. The computer 110 includes at least one memory 116 ("memory") storing program code 118, a network interface 114, and at least one processor 112 ("processor") that executes the program code 118 to perform operations described herein. The computer 110 is coupled to the network metrics repository 130, the policy neural network circuit 120, the fuzzy logic circuit 132, and the critic neural network circuit 134. The remote electrical tilt antenna management computer system 100 can be connected to monitor a communication network 140 that includes a plurality of network nodes 142 that receive and forward communication packets being communicated through the network that include cell performance metrics for cells in communication network 140. More particularly, the processor 112 can be connected via the network interface 114 to communicate with the network nodes 142 and the network metrics repository 130.

The processor 112 may include one or more data processing circuits, such as a general purpose and/or special purpose processor (e.g., microprocessor and/or digital signal processor) that may be collocated or distributed across one or more networks. The processor 112 may include one or more instruction processor cores. The processor 112 is configured to execute computer program code 118 in the memory 116, described below as a non-transitory computer readable medium, to perform at least some of the operations described herein as being performed by any one or more elements of the RET antenna management computer system 100.

Figure 2:
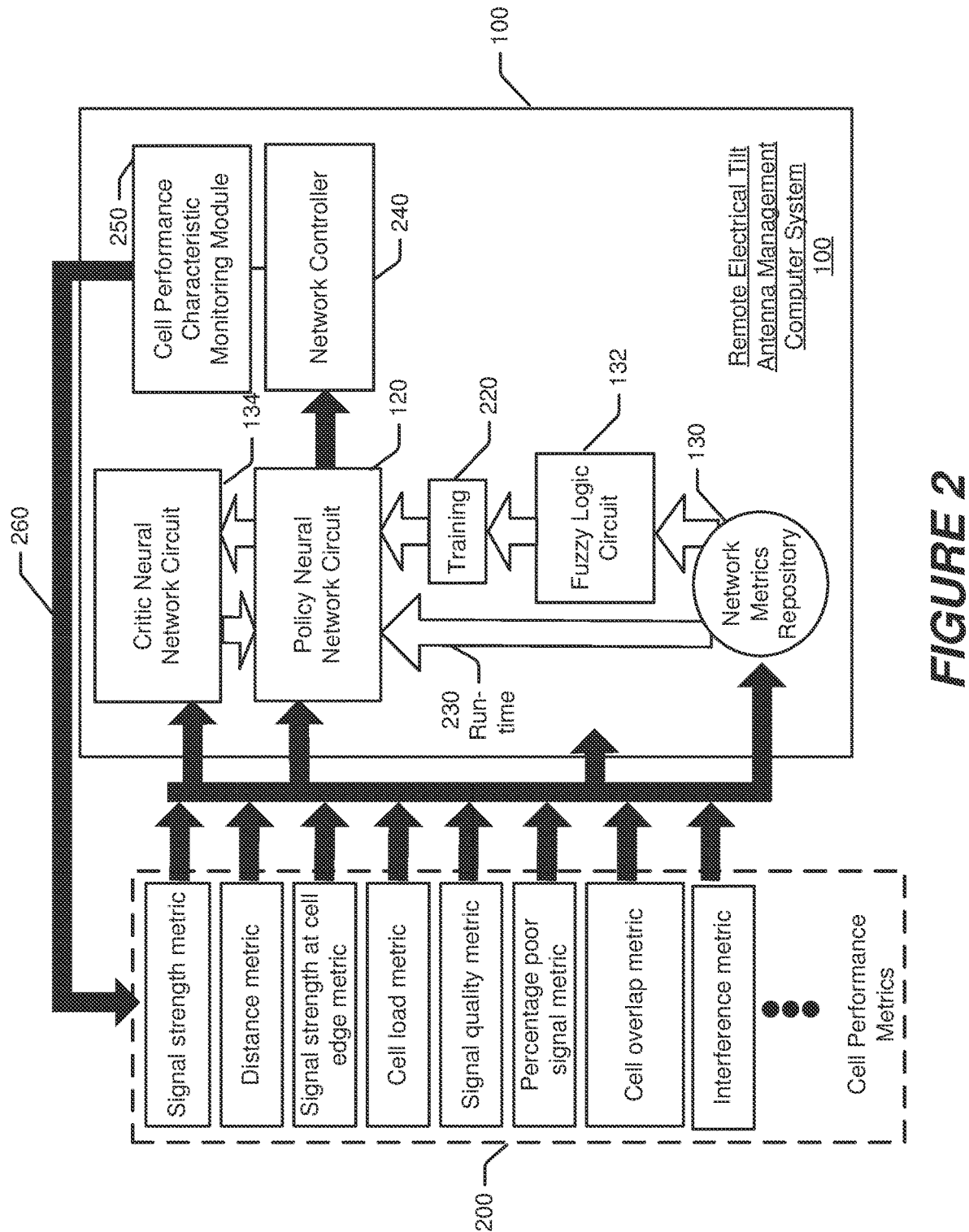
FIG. 2 illustrates an operational view of the remote electrical tilt antenna management computer system that is processing the cell performance metrics of a cell(s) of the communications network in accordance with some embodiments.

FIG. 2 illustrates an operational view of the remote electrical tilt antenna management computer system 100 that is processing the cell performance metrics 200 of the network nodes 142 for a cell under evaluation and/or its neighboring cells of the communications network 140.

Referring to FIG. 2, network metrics repository 130 may store rule-based data including cell performance metrics 200 that were measured during operation of a communication network. The rule-based data may have been generated by an expert and/or rule based policy. A cell performance characteristic monitoring module 250 can operate to monitor performance characteristics of cells in a live communication network (e.g., measure interference that a target cell creates with at least one neighboring cell or receive measurements from the network nodes) to generate various defined types of cell performance metrics therefrom. The cell performance metrics 200 from a live communication network can be input to network metrics repository 130. The cell performance metrics 200 that can be generated 260 for each of the cells and input to the RET antenna management computer system 100 for processing, can include, without limitation, signal strength to user equipment in a cell under evaluation, distance of user equipment from a RET antenna, signal strength provided to user equipment at an edge of a cell, load on a cell and load on a neighboring cell, signal quality at a defined distance from the RET antenna, percentage of user equipment at a cell edge that suffer from poor signal strength, overlap between a cell and at least one neighboring cell, interference that a cell creates with at least one neighboring cell, etc.

The cell performance metrics 200 can be input to the network metrics repository 130 for storage and may also be input to a fuzzy logic circuit 132. The network metrics repository 130 may also store reward values which correlate to a cell performance metric difference before and after tilting a RET antenna. The fuzzy logic circuit 132 includes at least one fuzzy inference circuit, and operates to generate fuzzy logic data by the fuzzy logic circuit applying fuzzy logic to rule-based data which may be obtained from network metrics repository 130. The fuzzy logic circuit converts input cell performance metric values into fuzzy data sets. The fuzzy logic data sets may include a correlated set of a cell performance metric, a tilt angle of a RET antenna, and a reward value. The fuzzy inference engine may use rules to generate an output action (e.g., if interference is high, downtilt the antenna). The output action may be defuzzified to assign numeric values to the result (e.g., how much to uptilt/downtilt in degrees).

During a training mode 220, the fuzzy logic data sets from the fuzzy logic circuit 132 are provided to input nodes of the policy neural network circuit 120. The policy neural network circuit 120 processes the inputs to the input nodes through neural network hidden layers which combine the inputs, as will be described below, to provide outputs for combining by an output node. The output node provides an output value responsive to processing through the input nodes of the policy neural network circuit a stream of cell performance metrics that are obtained during operation of the communication network 140. The value output by the output node of the policy neural network 120 may function as a probability of actions (i.e., increase tilt angle, decrease tilt angle, or no change in tilt angle). The output node on the policy neural network circuit 120 also generates a policy reward value that correlates a cell performance metric difference before and after tilting the RET antenna. The policy neural network circuit 120 may use the policy reward value to further train the policy neural network circuit 120.

During a training mode, the training module 220 adapts weights that are used by at least the input nodes of the policy neural network circuit 120 responsive to policy reward value output of the output node of the policy neural network circuit 120.

The training module 220 also may operate to use the policy reward value to adapt the weights which may be used by nodes of the policy neural network circuit 120 network hidden layers.

During a run-time mode 230, as described further below, one or more cell performance metrics 200 are provided to input nodes of the policy neural network circuit 120. The policy neural network circuit 120 processes the inputs to the input nodes through neural network hidden layers which combine the inputs, as will be described below, to provide outputs for combining by an output node. The output node provides an output value responsive to processing through the input nodes of the neural network circuit a stream of cell performance metrics that are obtained during live operation of the communication network 140. The output by the output node of the policy neural network 120 may function as a probability of actions (i.e., to increase tilt angle, decrease tilt angle, or no change in tilt angle). The output node on the policy neural network circuit 120 also generates a policy reward value that correlates to a cell performance metric difference before and after tilting the RET antenna.

Policy improvement via safety exploration will now be discussed. The rule based policy used for training may be sub-optimal and exploration may be needed to achieve an improved policy. In various embodiments, operations may be performed by a processor of a RET antenna management computer system 100 (e.g., processor 112) executing an algorithm to perform safety exploration operations based on rule-based policy. An exemplary algorithm is shown in FIG. 15.

Referring to FIG. 15, line 1 identifies exemplary apparatus of and inputs to the RET antenna management computer system 100 to perform operations of the algorithm. The apparatus and inputs include fuzzy-logic ($\pi_0$), pre-trained policy neural network circuit ($\pi_\theta$), a critic neural network circuit ($Q_\varphi$), experience buffer (B) (also referred to herein as network metrics repository 130), and hyper-parameters M and $\varepsilon$. M is a retraining period that may be a value in time units. $\varepsilon$ is a defined safety threshold value, as described further below.

Still referring to FIG. 15, at line 2, for episodes k=1, 2 . . . , a processor (e.g., processor 112 will be used in the following example) executes computer program code to perform operations described in lines 2-14. K represents a number of episodes (also referred to as actions), e.g.,1, 2, . . . etc. Processor 112 observes a state from environment 140 (line 3). For example, processor 112 observes a cell performance metric 200 from a cell served by a network node 142 in communication network 140. At lines 4-8, processor 112 measures a form of distance over action probability vector (line 4). If the distance of the vector $(\pi_0(s), \pi_\theta(s))$ is less than a defined safety threshold value ($\epsilon$), then (at lines 5-8) processor 112 samples action $\tilde{a}$ and $\hat{a}$ from $\pi_0$ and $\pi_\theta$, respectively. For example, for the operations described in lines 4-14 of FIG. 14, processor 112 may measure a Euclidian distance between the output of executing fuzzy-logic rule-based policy and a policy of policy neural network circuit 120. If the distance is small, processor 112 determines that the policy of policy neural network circuit 120 satisfies the safety constraints, and will sample an action from the policy and execute it. By using the existing fuzzy-logic rule-based policy as a baseline policy, some risky actions can be prohibited from being explored.

At lines 9-13, processor 112 operates critic neural network circuit 134 ($Q_\varphi$) to perform a double safety check. Critic neural network circuit 134 ($Q_\varphi$) may be trained by (s, a, r) pairs. A goal of the critic neural network circuit 134 may be to estimate expected reward given (s, a) pairs.

If $Q_\varphi(s, \tilde{a})$ is greater than 0 or if $Q_\varphi(s, \hat{a})$ is less than zero then (at lines 9-13), processor 112 executes action $\tilde{a}$ and observes reward $\tilde{r}\tilde{a}$ or executes action $\hat{a}$ and observes reward $\tilde{r}\hat{a}$.

Regardless of the action chosen by the policy neural network circuit 120, the experience is saved (line 15) to continue to train the policy neural network circuit 120 and/or the critic neural network circuit 134 (e.g, save the (s, $\hat{a}$, $\tilde{r}\tilde{a}$) and/or (s, $\hat{a}$, $\tilde{r}\tilde{a}$) into experience buffer B).

At line 17, processor 112 performs operations to train the policy neural network circuit 120 and/or the critic neural network circuit 134 using conventional training as described, for example, in Feiyang Pan, et al. "Policy Gradients for General Contextual Bandits". https://arxiv.org/abs/1802.04162.

Still referring to FIG. 15, at lines 18-22, after a defined number of training intervals M, processor 112 performs operations to adapt the defined safety threshold value $\epsilon$. If after the defined number of training intervals M, the average $\tilde{r}\tilde{a}$ is greater than zero, processor 112 operates to increase the value of the defined safety threshold $\epsilon$ (lines 18-19). If after the defined number of training intervals M, the average $\tilde{r}\tilde{a}$ is less than zero, processor 112 operates to decrease the value of the defined safety threshold $\epsilon$ (lines 20-21). Preferably, the defined safety threshold value $\epsilon$ is increased to a large number, and the policy neural network circuit 120 will no longer be bounded by the rule-based fuzzy logic policy, and an improved policy is achieved via the safety exploration operations.

At line 23, processor 112 operates to reset the average reward value $\tilde{r}\tilde{a}$ used in the policy neural network circuit 120 and/or the critic neural network circuit 134.

Figure 3:
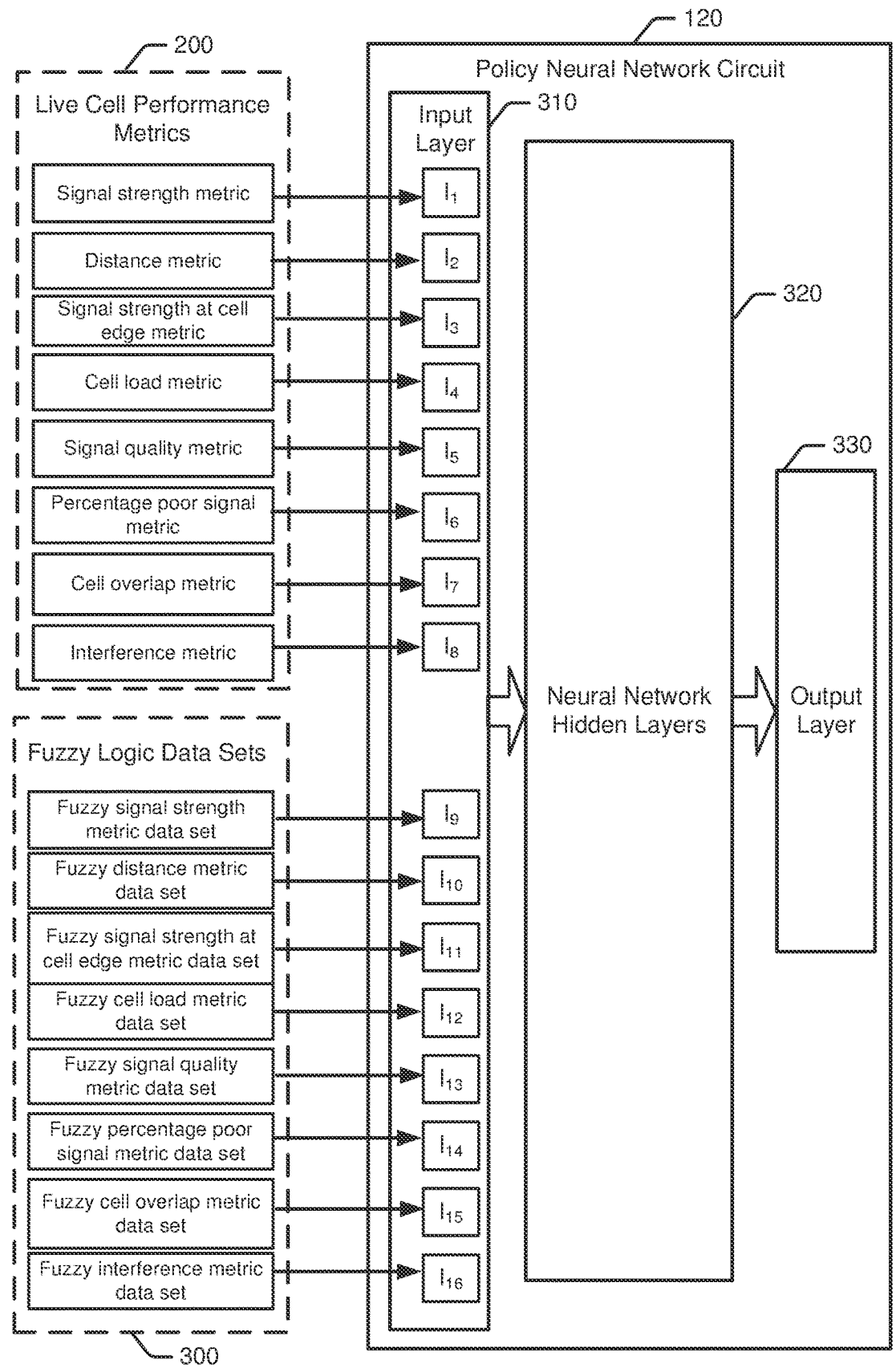
FIG. 3 illustrates elements of the neural network circuit which are interconnected and configured to operate in accordance with some embodiments.

FIG. 3 illustrates that the policy neural network circuit 120 can include an input layer 310 with input nodes "I", a sequence of hidden layers 320 each having a plurality of combining nodes, and an output layer 330 having an output node. Each of the input nodes "I" can be connected to receive a different type of the cell performance metrics 200 and the fuzzy logic data sets, such as shown in FIG. 3. Example operations of the combining nodes and output node are described in further detail below with regard to FIG. 4.

In the non-limiting illustrative embodiment of FIG. 3, during a training mode 220, the fuzzy logic circuit 132 has generated fuzzy logic data sets 300 which are at least based on earlier metrics from rule-based cell performance metrics 200 stored in network metrics repository 130. For example, the fuzzy logic data sets 300 can include, without limitation, a fuzzy signal strength to user equipment in a cell under evaluation data set, fuzzy distance of user equipment from a RET antenna data set, fuzzy signal strength provided to user equipment at an edge of a cell data set, fuzzy load on a cell and load on a neighboring cell data set, fuzzy signal quality at a defined distance from the RET antenna data set, fuzzy percentage of user equipment at a cell edge that suffer from poor signal strength data set, fuzzy overlap between a cell and at least one neighboring cell data set, fuzzy interference that a cell creates with at least one neighboring cell data set, etc. The fuzzy data set(s) may include a correlated set of data including a cell performance metric, a tilt angle of a RET antenna, and a reward value.

Still referring to FIG. 3, during run-time mode 230, the policy neural network circuit 120 operates the input nodes of the input layer 310 to each receive different cell performance metrics 200. Each of the input nodes multiply a cell performance metric value that are input by a reward value 260 that is feedback to the input node to generate a weighted cell performance metric value. When the weighted cell performance metric value exceeds a firing threshold assigned to the input node, the input node then provides the weighted cell performance metric value to the combining nodes of the first one of the sequence of the hidden layers 320. The input node does not output the weighted cell performance metric value if and until the weighted metric value exceeds the assigned firing threshold Although the embodiment of FIG. 3 shows a one-to-one mapping between each type of cell performance metric 200 or fuzzy logic data set 300 and one input node of the input layer 310, other embodiments are not limited thereto. For example, in a first embodiment, a plurality of different types of cell performance metrics can be combined to generate a combined cell performance metric that is input to one input node of the input layer 310. Alternatively or additionally, in a second embodiment, a plurality of cell performance metrics over time for a single type of cell performance metric for a cell and/or its neighboring cells can be combined to generate a combined cell performance metric that is input to one input node of the input layer 310.

In one illustrative embodiment, the processor 112 of system 100 combines a plurality of the cell performance metrics 200 in a stream during operation of the communication network to generate an aggregated cell performance metric. Operation of the tilt angle of the RET antenna is then based on output of the output node of the output layer 330 of the policy neural network circuit 120 while processing through the input nodes "I" of the input layer 310 of the policy neural network circuit 120 the aggregated measured performance.

Figure 4:
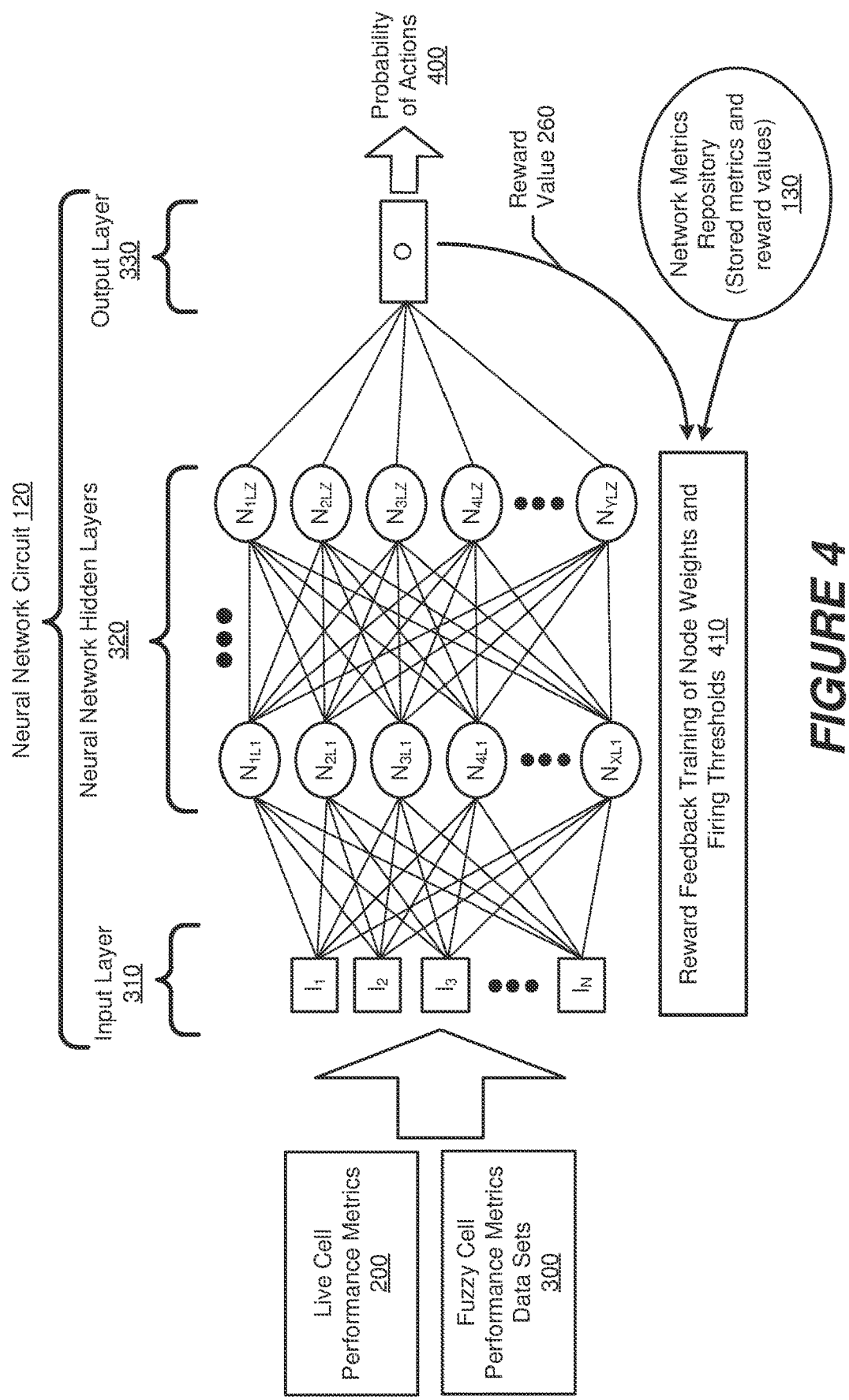
FIG. 4 is a block diagram and data flow diagram of a neural network circuit that can be used in the remote electrical tilt antenna management computer system to generate a probability of actions and a reward value in accordance with some embodiments.

FIG. 4 is a block diagram and data flow diagram of a policy neural network circuit 120 that can be used in the RET antenna management computer system 100 to generate a probability of actions (i.e., tilt angles) 400 and perform feedback training of the node weights and firing thresholds 410 of the input layer 310, the neural network hidden layers 320 and the output layer 330.

Referring to FIG. 4, the policy neural network circuit 120 includes the input layer 310 having a plurality of input nodes, the sequence of neural network hidden layers 320 each including a plurality of weight nodes, and the output layer 330 including an output node. In the particular non-limiting example of FIG. 4, the input layer 310 includes input nodes $I_1$ to $I_N$ (where N is any plural integer). The cell performance metrics 200 and the fuzzy logic data sets 300 are provided to different ones of the input nodes $I_1$ to $I_N$. A first one of the sequence of neural network hidden layers 320 includes weight nodes $N_{1L1}$ (where "1L1" refers to a first weight node on layer one) to $N_{XZ1}$ (where X is any plural integer). A last one ("Z") of the sequence of neural network hidden layers 320 includes weight nodes $N_{1LZ}$ (where Z is any plural integer) to $N_{YLZ}$ (where Y is any plural integer). The output layer 330 includes an output node O.

The policy neural network circuit 120 of FIG. 4 is an example that has been provided for ease of illustration and explanation of one embodiment. Other embodiments may include any non-zero number of input layers having any non-zero number of input nodes, any non-zero number of neural network layers having a plural number of weight nodes, and any non-zero number of output layers having any non-zero number of output nodes. The number of input nodes can be selected based on the number of cell performance metrics 200 and fuzzy logic data sets 300 that are to be simultaneously processed, and the number of output nodes can be similarly selected based on the number of probability values 400 that are to be simultaneously generated therefrom.

The policy neural network model 120 can be operated to process different cell performance metrics 200 and fuzzy logic data sets 300, during a training mode by the training module 220 and/or during the run-time mode 230, through different inputs (e.g., input nodes $I_1$ to $I_N$) of the policy neural network circuit 120. Cell performance metrics 200 that can be simultaneously processed through different input nodes $I_1$ to $I_N$ may include at least one of the following:

1) signal strength to user equipment in a cell under evaluation;
2) distance of user equipment from a RET antenna;
3) signal strength provided to user equipment at an edge of a cell;
4) load on a cell and load on a neighboring cell;
5) signal quality at a defined distance from the RET antenna;
6) percentage of user equipment at a cell edge that suffer from poor signal strength;
7) overlap between a cell and at least one neighboring cell; and
8) interference that a cell creates with at least one neighboring cell.

Correspondingly, the fuzzy logic circuit 132 can output fuzzy logic data sets from cell performance metrics 200 that are processed through different ones of the input nodes nodes $I_1$ to $I_N$.

Still referring to FIG. 4, during training mode 220, the policy neural network circuit 120 operates the input nodes of the input layer 310 to each receive different rule-based logic data set(s) 300 that include a correlated set of a cell performance metric, a tilt angle of a RET antenna, and a reward value. Each of the input nodes multiply fuzzy logic data values that are input by a weight that is assigned to the input node corresponding to the reward value 260 to generate a weighted metric value. When the weighted metric value exceeds a firing threshold assigned to the input node, the input node then provides the weighted metric value to the combining nodes of the first one of the sequence of the hidden layers 320. The input node does not output the weighted metric value if and until the weighted metric value exceeds the assigned firing threshold.

The policy neural network circuit 120 further operates the combining nodes of the hidden layers 320 using the reward value 260 that was fedback to multiply and combine the combined cell performance metric values provided by the plurality of combining nodes of a previous one of the sequence of hidden layers to generate combined cell performance metric values. When the combined cell performance metric value generated by one of the combining nodes exceeds a firing threshold assigned to the combining node to then provide the combined cell performance metric value to at least one output node of the output layers 330.

The policy neural network circuit 120 further operates at least one output node of the output layers 330 to combine the combined cell performance metric values provided by the combining nodes of the last one of the sequence of hidden layers 320 to generate the output value 400 used for determining the probability of actions and reward value 260.

Still referring to FIG. 4, during run-time mode 230 in a live communication network 140, the policy neural network circuit 120 operates the input nodes of the input layer 310 to each receive different cell performance metrics 200. Each of the input nodes multiply cell performance metric values that are input by a weight that is assigned to the input node corresponding to the reward value 260 to generate a weighted metric value. When the weighted metric value exceeds a firing threshold assigned to the input node, the input node then provides the weighted metric value to the combining nodes of the first one of the sequence of the hidden layers 320. The input node does not output the weighted metric value if and until the weighted metric value exceeds the assigned firing threshold.

The policy neural network circuit 120 further operates the combining nodes of the hidden layers 320 using the reward value 260 that was fedback to multiply and combine the combined cell performance metric values provided by the plurality of combining nodes of a previous one of the sequence of hidden layers to generate combined cell performance metric values. When the combined cell performance metric value generated by one of the combining nodes exceeds a firing threshold assigned to the combining node to then provide the combined cell performance metric value to at least one output node of the output layers 330.

The policy neural network circuit 120 further operates at least one output node of the output layers 330 to combine the combined cell performance metric values provided by the combining nodes of the last one of the sequence of hidden layers 320 to generate the output value 400 used for determining the probability of actions and reward value 260.

Still referring to FIG. 4, during run-time mode 220 and training mode 230, the interconnected structure between the input nodes 310, the weight nodes of the neural network hidden layers 320, and the output nodes 330 may cause the characteristics of each inputted cell performance metric to influence the probability of actions 400 generated for all of the other inputted cell performance metrics that are simultaneously processed.

Still referring to FIG. 4, during run-time mode 220, a training module 410 uses feedback of a reward value 260 may be output by the output node of output layer 330 and also may be stored in the network metrics repository 130. Reward value 260 is input to training module 410, and is used to adjust the weights and the firing thresholds of the input nodes of the input layer 310, and may further adjust the weights and the firing thresholds of the hidden layer nodes of the hidden layers 320 and the output node of the output layer 330.

In an illustrative embodiment, the operation 410 (FIG. 4) to adapt the weights and/or firing thresholds, which are used by at least the input nodes of the policy neural network circuit 120 to generate outputs to the combining nodes of a first one of the sequence of the hidden layers. The weights may be adapted based on the difference between the desired output and the actual output of neural network circuit 120. The difference may be referred to as a reward value 260. The reward value may be propagated backward through policy neural network circuit 120 in operation 410. For at least each input node, reward value 260 may be used to adjust the weights of the nodes to result in less error in the future for the same inputs. Policy neural network circuit 120 may combine these different weighted inputs with reference to a defined firing threshold value and output a probability of actions. The defined firing threshold may be a value that defines whether or not to activate the output. In other words, the weights and/or firing thresholds are adapted using reward value 260 to increase the probability of an action which has provided higher performance improvement for a given input cell performance metric.

Furthermore, the policy neural network circuit 120 operates the combining nodes of the first one of the sequence of the hidden layers 320 using reward values 260 to multiply and mathematically combine weighted metric values provided by the input nodes to generate combined metric values, and when the combined metric value generated by one of the combining nodes exceeds a firing threshold assigned to the combining node to then provide the combined metric value to the combining nodes of a next one of the sequence of the hidden layers 320.

Furthermore, the policy neural network circuit 120 operates the combining nodes of a last one of the sequence of hidden layers 320 using reward value 260 to multiply and combine the combined metric values provided by a plurality of combining nodes of a previous one of the sequence of hidden layers to generate combined metric values, and when the combined metric value generated by one of the combining nodes exceeds a firing threshold assigned to the combining node to then provide the combined metric value to the output node of the output layer 330.

Finally, the output node of the output layer 330 is then operated to combine the combined cell performance metric values to generate the output value used for determining the probability of actions.

In one illustrative embodiment, the policy neural network circuit 120 operates the input nodes of the input layer 310 to each receive different ones of the live cell performance metrics 200 and the fuzzy logic data sets 300. Each of the input nodes multiplies cell performance metric values that are inputted by a reward value 260 and are combined to generate a weighted metric value. If and when the weighted metric value exceeds a firing threshold assigned to the input node, the weighted metric value is then outputted to the combining nodes of the first one of the sequence of the hidden layers 320.

The policy neural network circuit 120 operates combining nodes of the first one of the sequence of the hidden layers 320 using reward value 260 to multiply and combine weighted metric values provided by the input nodes to generate combined metric values, and if and when the combined metric value generated by one of the combining nodes exceeds a firing threshold assigned to the combining node to then provide (output) the combined metric value to the combining nodes of a next one of the sequence of the hidden layers 320. The policy neural network circuit 120 also operate the combining nodes of a last one of the sequence of hidden layers using reward value 260 to multiply and combine the combined metric values provided by a plurality of combining nodes of a previous one of the sequence of hidden layers to generate combined metric values, and when the combined metric value generated by one of the combining nodes exceeds a firing threshold assigned to the combining node to then provide (output) the combined cell performance metric value to at least one output node of the output layer. The policy neural network circuit 120 operates the output node of the output layer 330 to combine the combined metric values provided by the combining nodes of the last one of the sequence of hidden layers 320 to generate the output values used for determining probability of actions 400.

Various operations that may be performed by the policy neural network circuit 120 in a runtime mode 230 to generate a probability of actions output 400 will now be explained.

Figure 5:
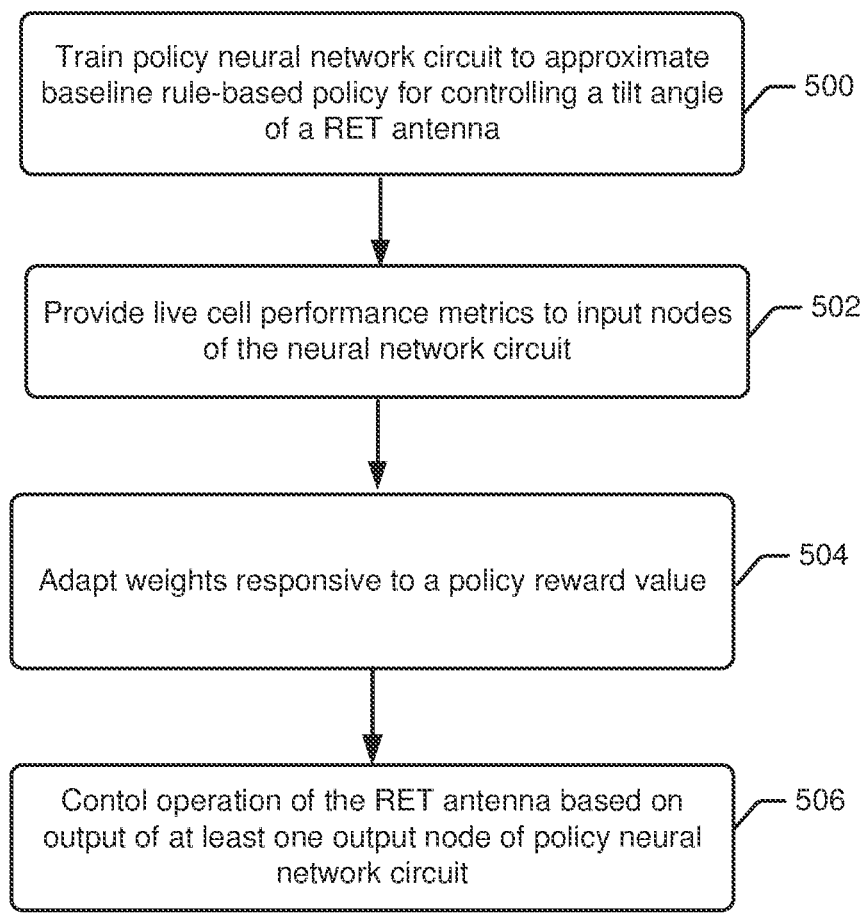
FIGS. 5-11 are flowcharts of operations that may be performed by the remote electrical tilt antenna management computer system in accordance with some embodiments.

FIG. 5 is a flowchart of operations that can be performed by the RET antenna management computer system 100 and, more particularly, by one or more processors performing the probability of actions outcome 400 and communicating action commands to network controller 240 or the RET antenna.

Referring to FIGS. 2, 3 and 4, the network metrics repository 130 can store the cell performance metrics 200 that are measured during operation of a communications network 140. The stored cell performance metrics 200 are used to train 500 the policy neural network circuit 120, when the policy neural network circuit 120 is offline a communication network, to approximate a baseline rule-based policy for controlling a tilt angle of a RET antenna based on the rule-based data stored in network metrics repository 130. The stored rule-based cell performance metrics 200 are provided to the input of fuzzy logic circuit 132. Fuzzy logic circuit 132 applies fuzzy logic to the stored rule-based cell performance metrics to generate data sets that include a correlated set of data that includes a cell performance metric(s), a tilt angle of a RET antenna, and a reward value, as described above. The fuzzy data set(s) is provided to input nodes of policy neural network circuit 120. Weights used by at least the input nodes 310 of neural network circuit 120 are adapted responsive to the policy reward value 260 of the output of at least one output node 330 of neural network circuit 120 when the policy neural network circuit 120 is offline a communication network. An output node of policy neural network circuit 120 outputs a probability of actions. The probability of actions output is provided responsive to processing through the input nodes 310 of the policy neural network circuit 120 at least one fuzzy cell performance data set 300. The output node also generates a policy reward value 260 that is used for reward feedback training 410 of node weights in policy neural network circuit 120. The policy reward value 260 also may be stored in network metric repository 130.

During a runtime mode 230, live data 200 received from a live communication network is provided 502 to the input nodes 310 of neural network circuit 120. The live data may include a live cell performance metric 200 for a cell under evaluation and/or a neighboring cell.

Weights that are used by at least the input nodes 310 of the policy neural network circuit 120 are adapted 504 responsive to a policy reward value 260 of an output 400 of at least one output node 330 of the policy neural network circuit 120 when the policy neural network circuit 120 is in communication with the live communication network.

Operation 506 of the remote electrical tilt antenna is controlled by network controller 240 based on probability of actions output 400 of at least one output node 330 of the policy neural network circuit 120. At least one output node 330 provides the output responsive to processing through the input nodes 310 of the policy neural network circuit 120 at least one live cell performance metric 200.

In one embodiment, the probability of actions output 400 of at least one output node 330 of the policy neural network circuit 120 includes a probability distribution of tilt values. The probability distribution of tilt angles includes a probability for each of a tilt increase, tilt decrease, and/or no change in tilt angle. The output 400 of at least one output node 330 of policy neural network circuit 120 also includes reward value 260.

In a further embodiment, the output 400 of at least one output node 330 of the policy neural network circuit 120 is based on comparing a first safety exploration output of at least one output node 330 of the policy neural network circuit 120 to a second rule-based output of at least one output node 330 of the policy neural network circuit 120.

The at least one output node 330 outputs the first safety exploration output 400 responsive to processing through the input nodes 310 of the policy neural network circuit 120 the live cell performance metric 200. The at least one output node outputs the second rule-based output 400 responsive to processing through the input nodes 310 fuzzy logic applied to the live cell performance metric 300.

Figure 6:
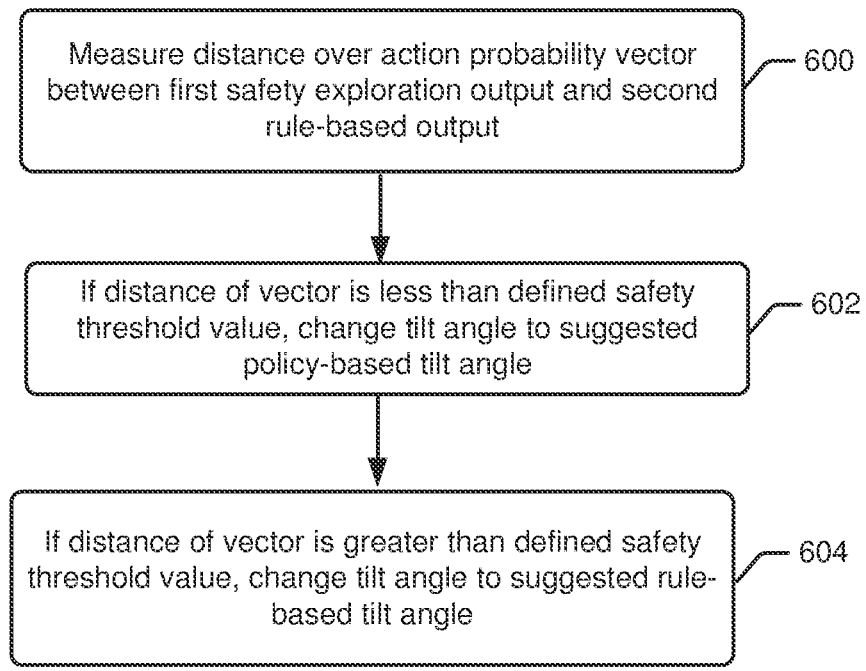

Referring to FIG. 6, further operations of at least one processor 112 are described. Processor 112 measures 600 a distance over action probability vector between the first safety exploration output and the second rule-based output. If the distance of the vector is less than a defined safety threshold value, processor 112 communicates 602 a command to a network node 142 to change the tilt angle of the remote electrical tilt antenna to the policy-based tilt angle in the first safety exploration output having the greatest probability and observes a first reward value 260a correlated to the first safety exploration output. If the distance of the vector is greater than the defined safety threshold value, processor 112 communicates 604 a command to a network node 142 to change the tilt angle of the remote electrical tilt antenna to the rule-based tilt angle in the second rule-based output and observe a second reward value 260b correlated to the second rule-based output.

Figure 7:
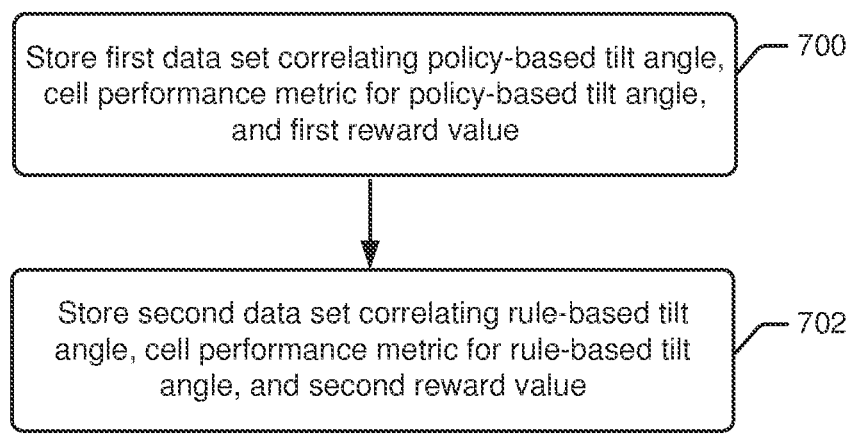

In another embodiment, referring to FIG. 7, further operations of at least one processor 112 are described. Processor 112 stores 700 in the network metrics repository 130 a first set of data correlating the policy-based tilt angle having the greatest probability from the first safety exploration output, the cell performance metric, and the first reward value. Processor 112 further stores 702 in the network metrics repository 130 a second set of data correlating the rule-based tilt angle suggested by the second rule-based output, the cell performance metric, and the second reward value.

In a further embodiment, the remote electrical tilt antenna management computer system 100 further includes a critic neural network circuit 134 having an input layer having input nodes, a sequence of hidden layers each having a plurality of combining nodes, and an output layer having at least one output node. The input layer having input nodes, the sequence of hidden layers each having a plurality of combining nodes, and the output layer having at least one output node may have the structure and run-time operations described herein regarding FIGS. 3 and 4 for policy neural network circuit 120.

Figure 8:
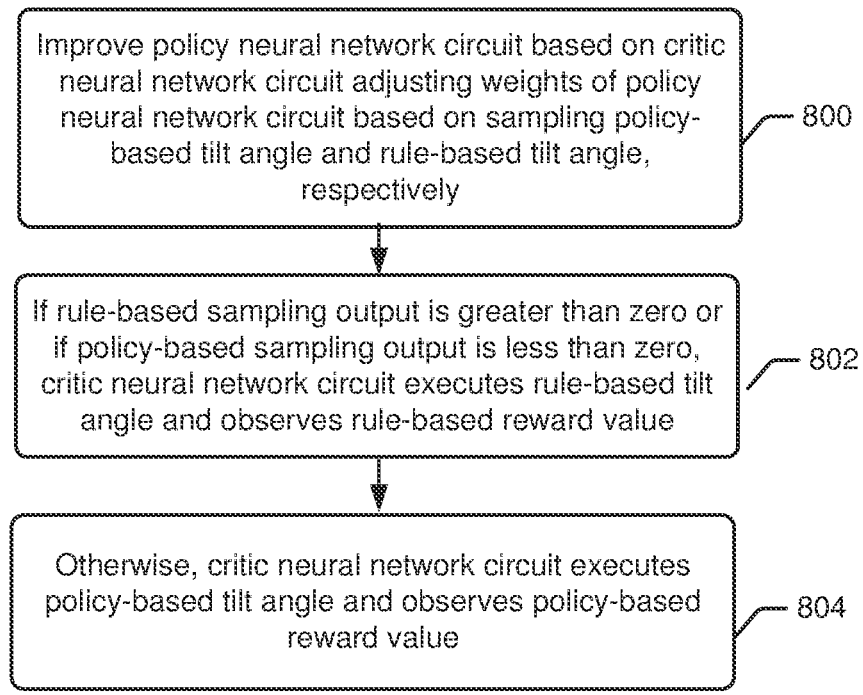

FIG. 8 is a block diagram of operational modules and related circuits and controllers of the RET antenna management computer system 100 that are configured to operate during the run-time mode 230.

The at least one processor 112 is further coupled to the critic neural network circuit 134. Processor 112 operates to improve 800 the policy neural network circuit 120 based on the critic neural network circuit 134 adjusting weights of the policy neural network circuit 120. The weights are adjusted based on the critic neural network circuit 134 sampling the policy-based tilt angle and rule-based tilt angle, respectively. If the rule-based sampling output is greater than zero or if the policy-based sampling output is less than zero, the critic neural network circuit 134 executes 802 the rule-based tilt angle and observes a critic neural network rule-based reward value, otherwise the critic neural network circuit 134 executes 804 the policy-based tilt angle and observes a critic neural network circuit policy-based reward value.

Figure 9:
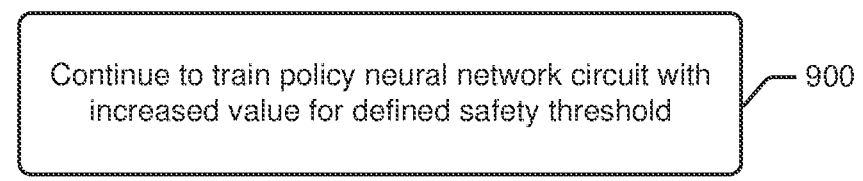
Figure 10:
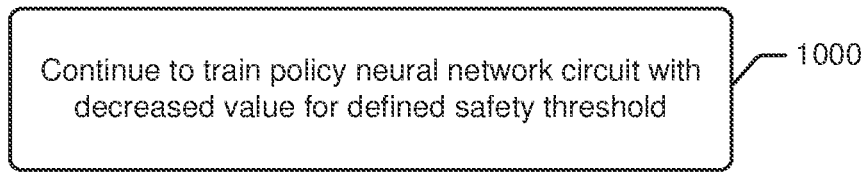

In a further embodiment, referring to FIG. 9, the at least one processor 112 operates to continue to train 900 the policy neural network circuit 120 with an increased value for the defined safety threshold based on increasing the value for the defined safety threshold when averaging first reward values over multiple training intervals results in an average first reward value that is greater than zero.

In another embodiment, the operations 502, 504, 506 of FIG. 5 are repeated for a stream of live cell performance metrics received from a live communication network. The operations include providing to the input nodes 310 of the policy neural network circuit 120 the stream of live cell performance metrics received from a live communication network. The operations further include adapting the weights 410 that are used by at least the input nodes 310 of the policy neural network circuit 120 responsive to a policy reward value 260 of an output 400 of at least one output node 330 of the policy neural network circuit 120 when the policy neural network circuit 120 is in communication with the live communication network. The operations further include controlling operation 240 of the remote electrical tilt antenna based on output 400 of at least one output node of the policy neural network circuit 120. The at least one output node 330 providing the output 400 responsive to processing through the input nodes 310 of the policy neural network circuit 120 the stream of live cell performance metrics 200.

In some embodiments, states (e.g., cell performance metrics 200) input to the policy neural network circuit 120 may include more useful information than the existing rule-based fuzzy logic data input 300. In the pre-training operation, the policy neural network circuit 120 may be limited to approximating a rule-based policy's behavior. In online learning operations, the additional state information may be used to try to find a better policy.

Figure 11:
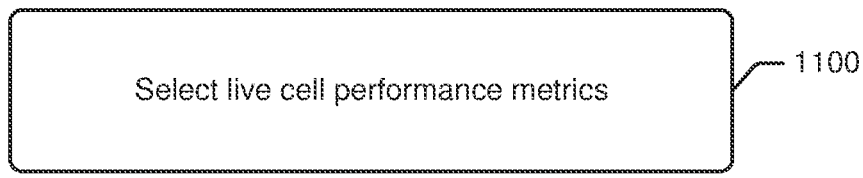

In some embodiments, referring to FIG. 11, dimensionality reduction techniques may be used to select 1100 (e.g., filter) important feature(s) of the state space (e.g, such as when additional cell performance metrics 200 are input to the policy neural network circuit). For example, SVD as described in B. Behzadian, M. Petrik, Feature Selection by Singular Value Decomposition for Reinforcement Learning, available at http://reinforcement-learning.ml/papers/pgmrl2018_behzadian.pdf, may be performed to compress the state space. By using, e.g., dimensionality reduction, manual or expensive feature engineering effort may be minimized.

Figure 12:
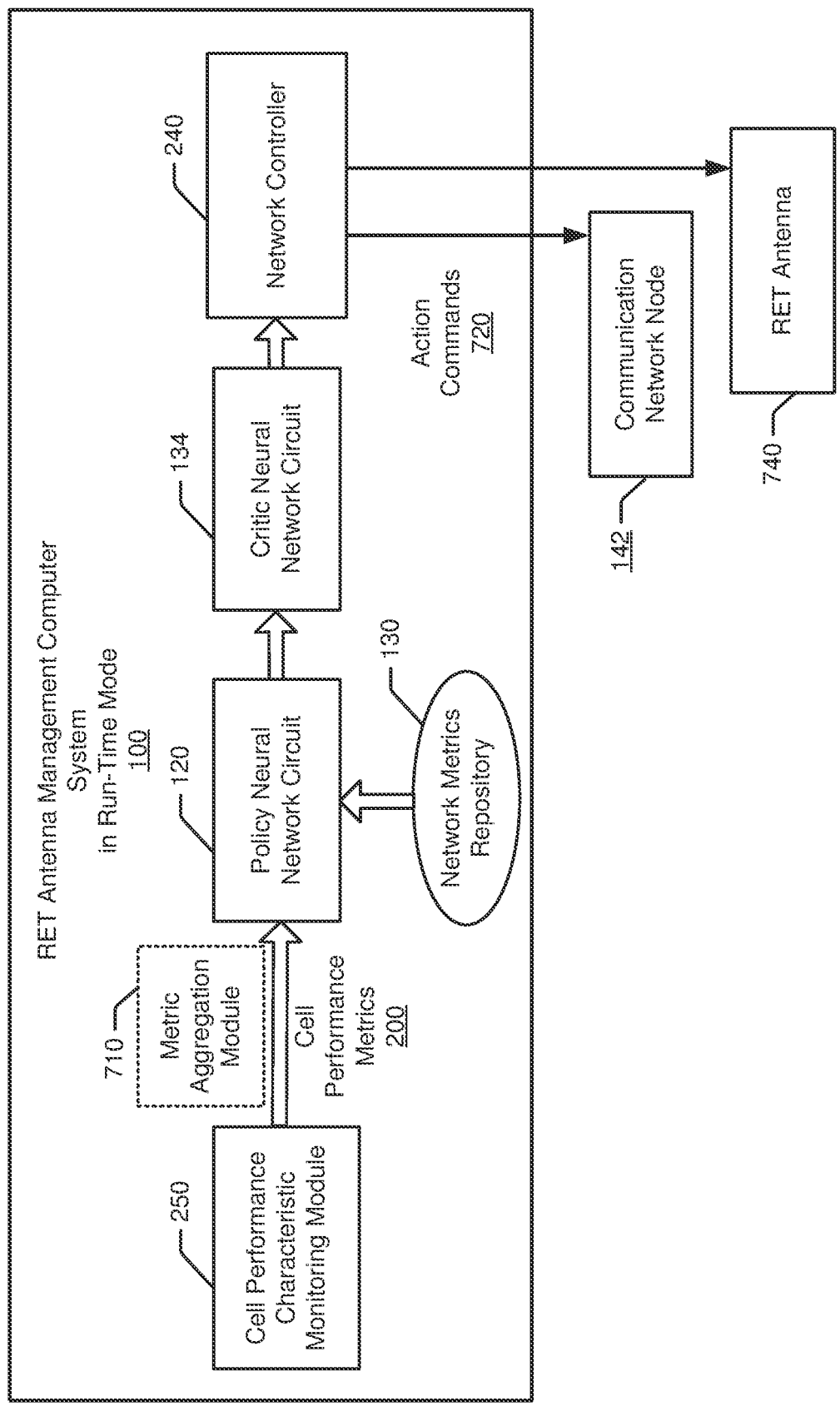
FIG. 12 is a block diagram of operational modules and related circuits and controllers of the remote electrical tilt antenna management computer system that are configured to operate during the run-time mode in accordance with some embodiments.

Referring to FIG. 12, in run-time mode 220, the cell performance characteristic monitoring module 250 outputs cell performance metrics 200 to the policy neural network circuit 120. A metric aggregation module 710 may combine a plurality of the cell performance metrics 200 to generate an aggregated measured performance metric, such as explained above in accordance with various embodiments. The policy neural network circuit 120 can operate on a stream of the incoming cell performance metrics and/or from earlier cell performance metrics retrieved from the network metrics repository 130. The probability of actions value 400 (FIG. 4) from the output node of the policy neural network circuit 120 is provided to the network controller 240. The network controller 240 can generate network action commands 720 which are communicated to a selected one of the communication network nodes 142 or RET antenna 740 to implement the RET antenna tilt angle of the probability of actions having highest probability.

Aspects of the present disclosure have been described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A remote electrical tilt antenna management computer system comprising:
   a network metrics repository that stores live cell performance metrics and stores rule-based data comprising cell performance metrics that were measured during operation of a communication network;
   a fuzzy logic circuit having at least one fuzzy inference circuit;
   a policy neural network circuit having an input layer having input nodes, a sequence of hidden layers each having a plurality of combining nodes, and an output layer having at least one output node;
   at least one processor coupled to the network metric repository, the fuzzy logic circuit, and the policy neural network circuit configured to:
   train the policy neural network circuit, when the policy neural network circuit is offline a communication network, to approximate a baseline rule-based policy for controlling a tilt angle of a remote electrical tilt antenna based on the rule-based data stored in the network metrics repository and fuzzy logic data generated by the fuzzy logic circuit applying fuzzy logic to the rule-based data to generate data sets that include a correlated set of a cell performance metric, a tilt angle of a remote electrical tilt antenna, and a reward value to output a probability of actions for a cell under evaluation;

provide to the input nodes of the policy neural network circuit live data received from a live communication network, wherein the live data comprises a live cell performance metric for a cell under evaluation and/or a neighboring cell;

adapt the weights that are used by at least the input nodes of the policy neural network circuit responsive to a policy reward value of an output of the at least one output node of the policy neural network circuit when the policy neural network circuit is in communication with the live communication network; and control operation of the remote electrical tilt antenna based on output of the at least one output node of the policy neural network circuit, the at least one output node providing the output responsive to processing through the input nodes of the policy neural network circuit at least one live cell performance metric.

2. The remote electrical tilt antenna management computer system of claim 1, wherein the output of the at least one output node of the policy neural network circuit comprises a probability of actions for a cell under evaluation and the policy reward value for each probability.

3. The remote electrical tilt antenna management computer system of claim 2, wherein the output of the at least one output node of the policy neural network circuit is based on comparing a first safety exploration output of the at least one output node of the policy neural network circuit to a second rule-based output of the at least one output node of the policy neural network circuit.

4. The remote electrical tilt antenna management computer system of claim 3,
wherein the at least one output node outputs the first safety exploration output responsive to processing through the input nodes of the policy neural network circuit the live cell performance metric;
wherein the at least one output node outputs the second rule-based output responsive to processing through the input nodes fuzzy logic applied to the live cell performance metric; and wherein the at least one processor is further configured to:
measure a distance over action probability vector between the first safety exploration output and the second rule-based output;
if the distance of the vector is less than a defined safety threshold value, communicate a command to a network node and/or the remote electrical tilt antenna to change the tilt angle of the remote electrical tilt antenna to the policy-based tilt angle in the first safety exploration output having the greatest probability and observe a first reward value correlated to the first safety exploration output; and
if the distance of the vector is greater than the defined safety threshold value, communicate a command to a network node and/or the remote electrical tilt antenna to change the tilt angle of the remote electrical tilt antenna to the rule-based tilt angle in the second rule-based output and observe a second reward value correlated to the second rule-based output.

5. The remote electrical tilt antenna management computer system of claim 4, wherein the at least one processor is further configured to:
store in the network metrics repository a first set of data correlating the policy-based tilt angle having the greatest probability from the first safety exploration output, the cell performance metric for the policy-based tilt angle, and the first reward value; and
store in the network metrics repository a second set of data correlating the rule-based tilt angle suggested by the second rule-based output, the cell performance metric for the rule-based tilt angle, and the second reward value.

6. The remote electrical tilt antenna management computer system of claim 5,
wherein the remote electrical tilt antenna management computer system further comprises a critic neural network circuit having an input layer having input nodes, a sequence of hidden layers each having a plurality of combining nodes, and an output layer having at least one output node;
wherein the at least one processor is further coupled to the critic neural network circuit and is configured to:
improve the policy neural network circuit based on the critic neural network circuit adjusting weights of the policy neural network circuit, wherein the weights are adjusted based on the critic neural network circuit sampling the policy-based tilt angle and rule-based tilt angle, respectively; and
if the rule-based sampling output is greater than zero or if the policy-based sampling output is less than zero, the critic neural network circuit executes the rule-based tilt angle and observes a critic neural network rule-based reward value, otherwise the critic neural network circuit executes the policy-based tilt angle and observes a critic neural network circuit policy-based reward value.

7. The remote electrical tilt antenna management computer system of claim 5, wherein the at least one processor is further configured to:
continue to train the policy neural network circuit with an increased value for the defined safety threshold based on increasing the value for the defined safety threshold when averaging first reward values over multiple training intervals results in an average first reward value that is greater than zero.

8. The remote electrical tilt antenna management computer system of claim 4, wherein the at least one processor is further configured to:
continue to train the policy neural network circuit with a decreased value for the defined safety threshold based on decreasing the value of the defined safety threshold when averaging the first reward values over multiple training intervals results in an average first reward value that is less than zero.

9. The remote electrical tilt antenna management computer system of claim 1, wherein the communication network comprises at least one network node that receives and forwards communication signal packets that include the cell performance metrics, and wherein the cell performance metrics comprise at least one of the following:
signal strength to a user equipment in a cell under evaluation;
distance of the user equipment from the remote electrical tilt antenna;

signal strength provided to the user equipment at an edge of the cell;

load on the cell and load on a neighboring cell;

signal quality at a defined distance from the remote electrical tilt antenna;

percentage of user equipment at the cell edge that suffer from poor signal strength;

overlap between the cell and at least one neighboring cell; and interference that the cell creates with at least one neighboring cell.

10. The remote electrical tilt antenna management computer system of claim 1, wherein the at least one processor is further configured to:

repeat operations for a stream of live cell performance metrics received from a live communication network to:

provide to the input nodes of the policy neural network circuit the stream of live cell performance metrics received from a live communication network;

adapt the weights that are used by at least the input nodes of the policy neural network circuit responsive to a policy reward value of an output of the at least one output node of the policy neural network circuit when the policy neural network circuit is in communication with the live communication network; and control operation of the remote electrical tilt antenna based on output of the at least one output node of the policy neural network circuit, the at least one output node providing the output responsive to processing through the input nodes of the policy neural network circuit the stream of live cell performance metrics.

11. The remote electrical tilt antenna management computer system of claim 1, wherein the policy neural network circuit is configured to:

operate the input nodes of the input layers to each receive different ones of the cell performance metrics that are correlated to tilt angles of the remote electrical tilt antenna, each of the input nodes multiplying cell performance metric values that are inputted by a reward value that is fedback to the input node to generate a weighted cell performance metric, and when the weighted cell performance metric value exceeds a firing threshold assigned to the input node to then provide the weighted cell performance metric value to a first combining node of a sequence of hidden layers of an input layer having the input nodes;

operate the combining nodes of a first one of the sequence of the hidden layers using the reward value that was fedback thereto to multiply and combine weighted cell performance metric values provided by the input nodes to generate combined cell performance metric values, and when the combined cell performance metric value generated by one of the combining nodes exceeds a firing threshold assigned to the combining node to then provide the combined cell performance metric value to the combining node of a next one of the sequence of the hidden layers;

operate the combining nodes of a last one of the sequence of hidden layers using the reward value that was fedback to multiply and combine the combined cell performance metric values provided by the plurality of combining nodes of a previous one of the sequence of hidden layers to generate combined cell performance metric values, and when the combined metric value generated by one of the combining nodes exceeds a firing threshold assigned to the combining node to then provide the combined cell performance metric value to the at least one output node of the output layers; and operate the at least one output node of the output layers to combine the combined cell performance metric values provided by the combining nodes of the last one of the sequence of hidden layers to generate the output value used for determining the probability of actions and a reward value for each probability value.

12. The remote electrical tilt antenna management computer system of claim 1, wherein an operation to provide the input nodes of the policy neural network circuit the live cell performance metrics, comprises:

combine a plurality of the cell performance metrics to generate an aggregated live cell performance metric; and provide the aggregated live cell performance metric to the policy neural network circuit as one of the live cell performance metrics.

13. The remote electrical tilt antenna management computer system of claim 1, wherein the at least one processor is further configured to:

combine a plurality of the live cell performance metrics in a stream during operation of the communication network to generate an aggregated cell performance metric; and control operation of the tilt angle of the remote electrical tilt antenna based on output of the output node of the policy neural network circuit processing through the input nodes of the policy neural network circuit the aggregated cell performance metric.

14. The remote electrical tilt antenna management computer system of claim 1, further comprising:

selecting the live cell performance metrics to reduce the number of live cell performance metrics being input to the input nodes of the policy neural network circuit for processing.

15. A method by a remote electrical tilt antenna management computer system comprising:

accessing a network metrics repository that stores live cell performance metrics and stores rule-based data comprising cell performance metrics that were measured during operation of a communication network;

generating fuzzy logic data based on a fuzzy logic circuit having at least one fuzzy inference circuit applying fuzzy logic to the rule-based data to generate data sets that include a correlated set of a cell performance metric, a tilt angle of a remote electrical tilt antenna, and a reward value to output a probability of actions for a cell under evaluation;

training a policy neural network circuit, when the policy neural network circuit is offline a communication network, to approximate a baseline rule-based policy for controlling a tilt angle of a remote electrical tilt antenna based on the rule-based data stored in the network metrics repository and the fuzzy logic;

providing to the input nodes of the policy neural network circuit live data received from a live communication network, wherein the live data comprises a live cell performance metric for a cell under evaluation and/or a neighboring cell;

adapting the weights that are used by at least the input nodes of the policy neural network circuit responsive to a policy reward value of an output of the at least one output node of the policy neural network circuit when the policy neural network circuit is in communication with the live communication network; and controlling operation of the remote electrical tilt antenna based on output of the at least one output node of the policy neural network circuit, the at least one output node providing the output responsive to processing through the input nodes of the policy neural network circuit at least one live cell performance metric.

16. The method of claim 15, wherein the communications network comprises at least one network node that receives and forwards communication signal packets that include the cell performance metrics, and wherein the cell performance metrics comprise at least one of the following:
   signal strength to a user equipment in a cell under evaluation;
   distance of the user equipment from the remote electrical tilt antenna;
   signal strength provided to the user equipment at an edge of the cell;
   load on the cell and/or load on a neighboring cell;
   signal quality at a defined distance from the remote electrical tilt antenna;
   percentage of user equipment at the cell edge that suffer from poor signal strength;
   overlap between the cell and at least one neighboring cell; and
   interference that the cell creates with at least one neighboring cell.

17. The method of claim 15, the method further comprising:
   repeating operations for a stream of live cell performance metrics received from a live communication network to:
      providing to the input nodes of the policy neural network circuit the stream of live cell performance metrics received from a live communication network;
      adapting the weights that are used by at least the input nodes of the policy neural network circuit responsive to a policy reward value of an output of the at least one output node of the policy neural network circuit when the policy neural network circuit is in communication with the live communication network; and
      controlling operation of the remote electrical tilt antenna based on output of the at least one output node of the policy neural network circuit, the at least one output node providing the output responsive to processing through the input nodes of the policy neural network circuit the stream of live cell performance metrics.

18. The method of claim 15, the method further comprising:
   operating the input nodes of the input layers to each receive different ones of the cell performance metrics that are correlated to tilt angles of the remote electrical tilt antenna, each of the input nodes multiplying cell performance metric values that are inputted by a reward value that is fedback to the input node to generate a weighted cell performance metric, and when the weighted cell performance metric value exceeds a firing threshold assigned to the input node to then provide the weighted cell performance metric value to a first combining node of a sequence of hidden layers of an input layer having the input nodes;
   operating the combining nodes of a first one of the sequence of the hidden layers using the reward value that was fedback thereto to multiply and combine weighted cell performance metric values provided by the input nodes to generate combined cell performance metric values, and when the combined cell performance metric value generated by one of the combining nodes exceeds a firing threshold assigned to the combining node to then provide the combined cell performance metric value to the combining node of a next one of the sequence of the hidden layers;
   operating the combining nodes of a last one of the sequence of hidden layers using the reward value that was fedback to multiply and combine the combined cell performance metric values provided by the plurality of combining nodes of a previous one of the sequence of hidden layers to generate combined cell performance metric values, and when the combined metric value generated by one of the combining nodes exceeds a firing threshold assigned to the combining node to then provide the combined cell performance metric value to the at least one output node of the output layers; and
   operating the at least one output node of the output layers to combine the combined cell performance metric values provided by the combining nodes of the last one of the sequence of hidden layers to generate the output value used for determining the probability of actions and a reward value for each probability value.

19. The method of claim 15, wherein the method to provide the input nodes of the policy neural network circuit the live cell performance metrics, further comprises:
   combining a plurality of the cell performance metrics to generate an aggregated live cell performance metric; and
   providing the aggregated live cell performance metric to the policy neural network circuit as one of the live cell performance metrics.

20. The method of claim 15, the method further comprising:
   combining a plurality of the live cell performance metrics in a stream during operation of the communication network to generate an aggregated cell performance metric; and
   controlling operation of the tilt angle of the remote electrical tilt antenna based on output of the output node of the policy neural network circuit processing through the input nodes of the policy neural network circuit the aggregated cell performance metric.

* * * * *